US007981175B2

(12) United States Patent
D'hondt

(10) Patent No.: US 7,981,175 B2
(45) Date of Patent: Jul. 19, 2011

(54) SELF-CLEANING BLOW-OFF

(75) Inventor: David S. D'hondt, Zedelgem (BE)

(73) Assignee: CNH America LLC, New Holland, PA (US)

( * ) Notice: Subject to any disclaimer, the term of this patent is extended or adjusted under 35 U.S.C. 154(b) by 439 days.

(21) Appl. No.: 12/148,239

(22) Filed: Apr. 17, 2008

(65) Prior Publication Data

US 2008/0256915 A1    Oct. 23, 2008

Related U.S. Application Data

(60) Provisional application No. 60/925,079, filed on Apr. 18, 2007.

(51) Int. Cl.
*B01D 46/00* (2006.01)

(52) U.S. Cl. ............. 55/290; 55/294; 55/302; 55/385.3; 460/100; 460/117; 460/119

(58) Field of Classification Search ............. 55/289, 55/385.3, 290, 294, 302; 460/100, 117, 119; 95/279, 280
See application file for complete search history.

(56) References Cited

U.S. PATENT DOCUMENTS

| 2,639,780 | A | * | 5/1953 | Gordon | 55/296 |
| 3,155,473 | A | | 11/1964 | McNeil | 55/294 |
| 3,415,040 | A | | 12/1968 | Pool et al. | 55/283 |
| 3,847,072 | A | | 11/1974 | Garrison | 100/35 |
| 3,864,107 | A | * | 2/1975 | Baigas, Jr. | 55/290 |
| 4,155,602 | A | | 5/1979 | Quick | 406/104 |
| 4,233,040 | A | * | 11/1980 | Vogelaar et al. | 55/282.5 |
| 4,294,596 | A | * | 10/1981 | Taverez | 96/230 |
| 4,386,492 | A | | 6/1983 | Tilby | 56/13.9 |
| 4,439,218 | A | * | 3/1984 | Priepke et al. | 55/288 |
| 4,443,236 | A | * | 4/1984 | Peiler | 55/282.5 |
| 4,544,388 | A | | 10/1985 | Rao et al. | 55/282 |
| 4,725,292 | A | * | 2/1988 | Williams | 95/278 |
| 4,874,411 | A | | 10/1989 | Snauwaert et al. | 55/290 |

(Continued)

FOREIGN PATENT DOCUMENTS

CH    668611    1/1989

OTHER PUBLICATIONS 2 pp. Brochure, Cameco, a John Deere Company, 3510 Sugarcane Harvester, 2008.

*Primary Examiner* — Duane Smith
*Assistant Examiner* — Minh-Chau Pham
(74) *Attorney, Agent, or Firm* — Michael G. Harms; Patrick M. Sheldrake

(57) ABSTRACT

A self-cleaning blow-off for a rotary air screen, includes a blow-off channel including an inlet disposed for receiving a flow of air from a pressurized air source, and a movable blow-off channel section configured and supported to be movable between an operational position disposed adjacent to a portion of the air screen for directing the flow of air for blowing debris and dirt from the screen, and a cleaning position disposed away from the screen such that accumulated debris and dirt in the blow-off section will be released. And, an actuator is connected to and controllably operable for moving the movable blow-off section between the operating position and the cleaning position. The actuator can be controlled to move the movable blow-off section to the cleaning position periodically, as desired, or responsive to an input.

19 Claims, 6 Drawing Sheets

U.S. PATENT DOCUMENTS

| | | | |
|---|---|---|---|
| 5,042,237 A | 8/1991 | Sanderson | 56/10.2 |
| 5,238,473 A | 8/1993 | Femiani | 55/290 |
| 5,255,501 A | 10/1993 | McWilliams | 56/341 |
| 5,466,189 A * | 11/1995 | Deutsch et al. | 460/100 |
| 5,536,206 A | 7/1996 | Bodmer et al. | 454/65 |
| 5,676,197 A * | 10/1997 | Diebold et al. | 165/41 |
| 5,827,338 A * | 10/1998 | Horvat | 55/285 |
| 6,117,200 A * | 9/2000 | Berg et al. | 55/287 |
| 6,193,772 B1 * | 2/2001 | Wiefel | 55/283 |
| 6,272,819 B1 | 8/2001 | Wendte et al. | 56/11.9 |
| 6,464,083 B1 | 10/2002 | Harrison et al. | 209/213 |
| 6,514,303 B2 | 2/2003 | Lukac et al. | 55/289 |
| 6,974,487 B2 * | 12/2005 | Twiefel | 55/289 |
| 2004/0003578 A1 * | 1/2004 | Twiefel | 55/289 |
| 2007/0022720 A1 * | 2/2007 | Guertin | 55/289 |

* cited by examiner

US 7,981,175 B2

SELF-CLEANING BLOW-OFF

This application claims the benefit of U.S. Provisional Application No. 60/925,079, filed Apr. 18, 2007.

TECHNICAL FIELD

The present invention generally relates to a blow-off for a rotary air or dust screen, and, more particularly, to a self-cleaning blow-off including a channel structure for directing a stream of air over a segment of the screen, and apparatus operable for temporarily moving the channel temporarily away from the air screen, for instance, from time to time, to allow accumulated debris such as leaves, dirt, and dust, to fall or be carried away from the screen and the channel.

BACKGROUND ART

The disclosure of U.S. Provisional Application No. 60/925,079, filed Apr. 18, 2007, is hereby incorporated herein in its entirety by reference.

A wide variety of work machines utilize rotary air or dust screens for preventing entry of debris, and the like, e.g., dust, leaves and dirt, hereinafter sometimes referred to collectively as debris and/or dirt, into cooling systems, engine compartments and the like. Examples of such work machines include, but are not limited to, harvesting machines such as sugarcane harvesters.

Blow-off systems are commonly used with rotary air screens to clean the rotary air screen by blowing with air the debris, e.g., dust, leaves and other dirt, away from the screen. But, from time to time, aspects of the blow-off, particularly, a channel through which the air is directed, can become clogged or blocked up with this material, and as a result stops cleaning the screen. Typically, the block up of the channel is the result of the following mechanism: large leaves or branches get stuck in the channel and catch other dirt and/or leaves, and so gradually accumulate until a blockage of the channel occurs. When the channel is blocked up the rotary air screen becomes blocked with dirt. The blocked rotary air screen will restrict the air passing through and will result in a strong reduced cooling of the exchangers of the cooling system.

Accordingly, what is sought is a self-cleaning blow-off for a rotary air or dust screen, that overcomes one or more of the problems set forth above.

SUMMARY OF THE INVENTION

What is provided is a self-cleaning blow-off for a rotary air or dust screen, that overcomes one or more of the problems set forth above.

According to a preferred aspect of the invention, by making a section or part of the blow-off channel, particularly, the section located at the rotary air or dust screen, being able to move or turn away from the air screen, the blow-off channel is able to clean itself without stopping the rotary screen. The section of the channel at the rotary air screen is hinged or otherwise rendered movable relative to a preliminary section of the blow-off channel. In normal conditions (no self-cleaning action is taking place) the blow-off operates as without self-cleaning precautions. From time to time, or when this section of the blow-off channel is blocked, and actuator moves, e.g., swings, the blow-off section located at the rotary screen away from the rotary screen. Any debris that blocks the channel is evacuated from the channel so as to effectively clean the channel. After a selected amount of time, the blow-off channel swings back to its normal operational position. This completes one self-cleaning cycle. In a certain timeframe, this cycle can be repeated several times.

According to another preferred aspect of the invention, the blow-off can be mounted in a variety of locations about a rotary screen. If the blow-off is mounted on an upper region of a rotary screen, when the blow-off is moved away from the screen, the released debris and dirt from the blockage will be pushed away by the rotation of the screen. If the blow-off is mounted on a lower region of the screen, the released dirt will be removed by gravity, and, in addition, possible vibrations due to operation of the machine.

According to another preferred aspect of the invention, operation of the self-cleaning function of the blow-off can be achieved in any of the following ways:

manually, for instance by actuation of an operator controlled input device, such as a pushbutton, to operate the actuator;

using a sensor which detects when the blow-off channel is blocked, which can generate a signal to a controller for the actuator which will command the operation of the actuator, or which can activate an alarm in the operator cab to inform the operator of the blockage such that the operator can manually actuate the operator input, e.g., pushbutton;

time intervals, written in software, or controlled by a timer, which will operate the actuator at certain times;

linked to the operation of other parts/functions of the machine, e.g., activation of the unloading tube of a combine harvester or the like; and other suitable manners of operation.

As a desirable advantage of the self-cleaning blow-off of the invention, under heavy fouling conditions of the screen, stopping operation is not required to clean the blow-off channel manually.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
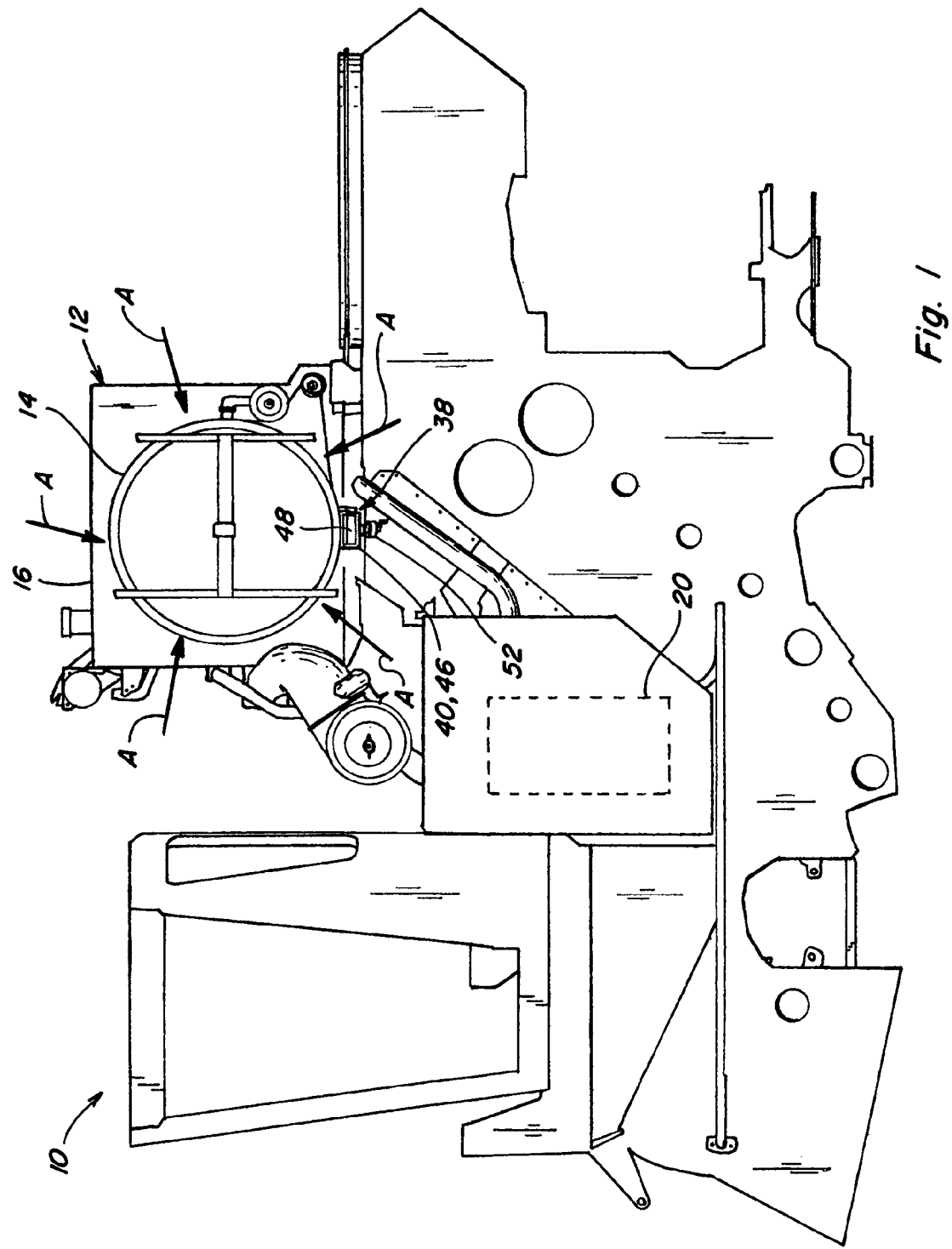
FIG. 1 is a side view of a frame of a sugarcane harvester including apparatus of the invention.
Figure 2:
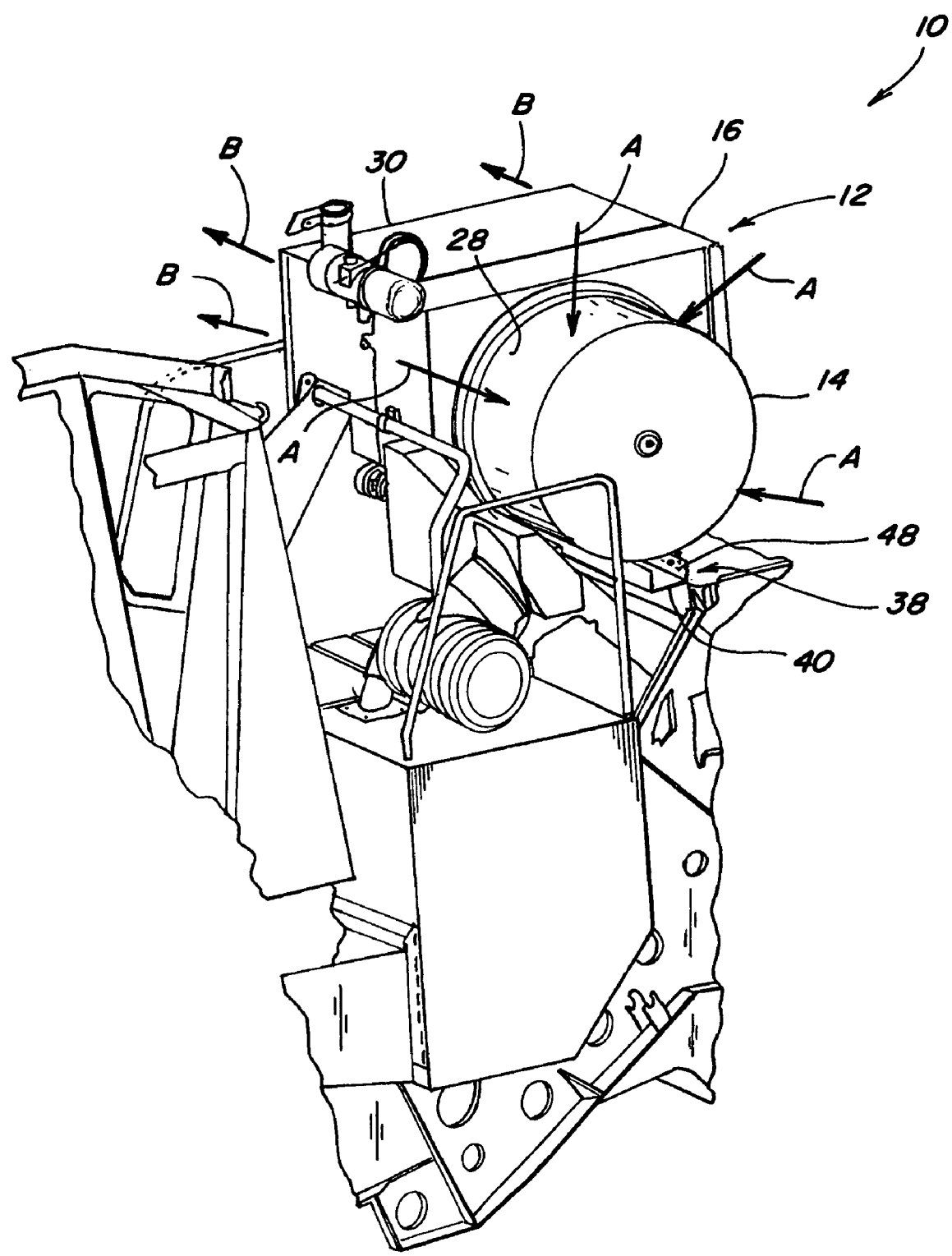
FIG. 2 is a simplified fragmentary perspective view of the harvester frame of FIG. 1 showing aspects of the apparatus of the invention.
Figure 3:
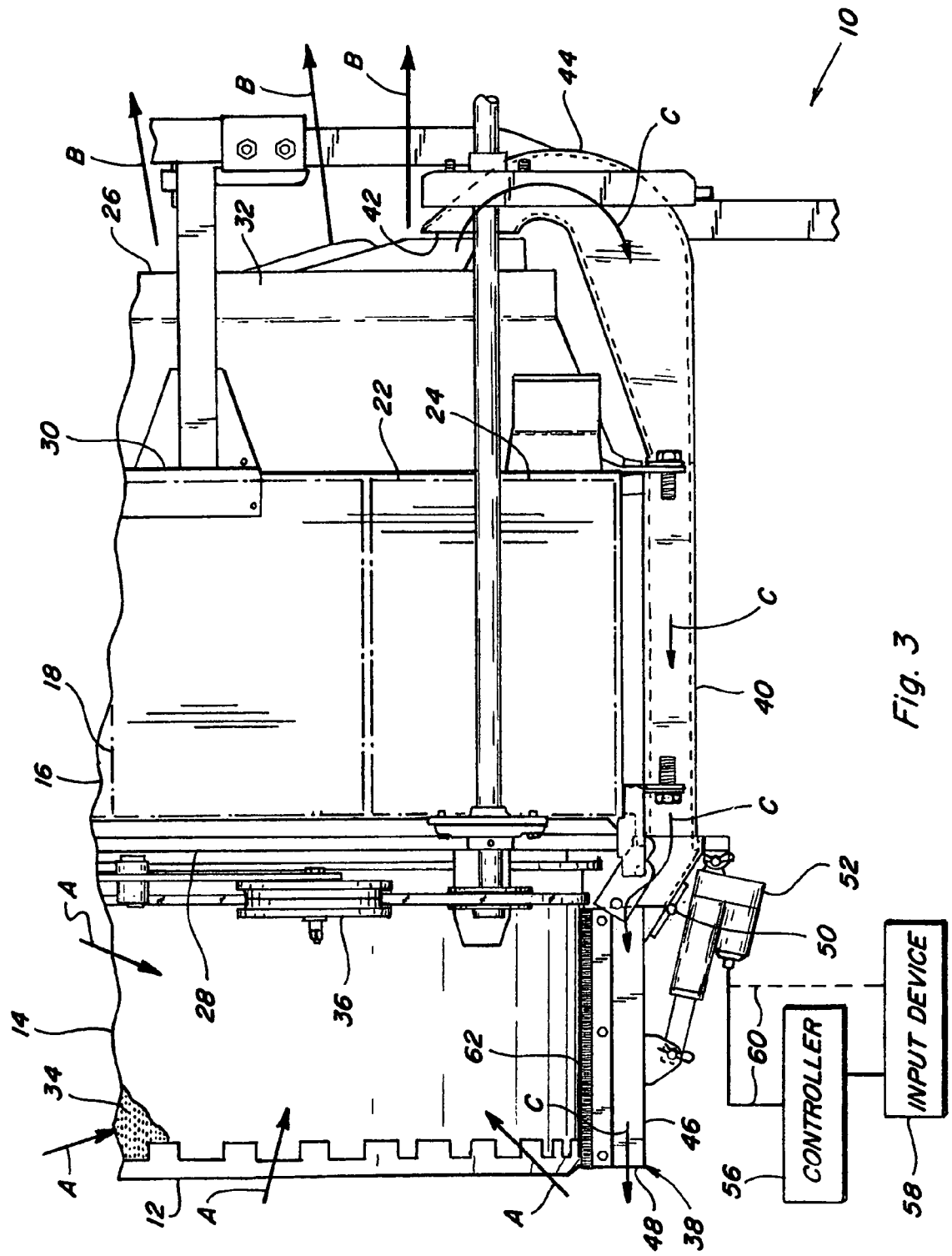
FIG. 3 is a fragmentary rear view of the apparatus of the invention.

Referring now to the drawings, in FIGS. 1, 2 and 3, a frame of a representative work machine, which is a sugarcane harvester frame 10, is shown including a cooling system 12 for cooling elements of the harvester in the well-known manner. Frame 10, when additional components are added, including wheels and driveline, harvesting apparatus, operator controls, and other well known features, will comprise a complete sugarcane harvester of well known construction. Reference in this regard, U.S. Pat. No. 6,272,819, which discloses a complete sugarcane harvester.

Cooling system 12 includes a rotary air screen 14 constructed and operable in a well-known manner, covering an air inlet to a cooler box 16 of cooling system 12 containing at least one heat exchanger. Here, the heat exchangers are arranged in a vertical stack within cooler box 16, and include a radiator 18 (FIG. 3) in an uppermost position in the stack, for cooling coolant of an engine 20 (FIG. 1); an oil cooler 22 in a middle position, for cooling oil of a hydraulic system (not shown); and an intercooler radiator 24 in the lowest position. Here, it should be noted that other heat exchanger arrangements can be used as desired or required for a particular application.

Cooling system 12 includes a fan box 26 on the end of cooler box 16 opposite air screen 14, containing a fan rotatable for generating a flow of air into air screen 14, as denoted by arrows A, through cooler box 16, so as to pass through radiator 18, oil cooler 22, and intercooler radiator 24, and through an outlet 30 of box 16, and through fan box 26, so as to be discharged from an outlet 32 thereof, as denoted by arrows B.

Rotary air screen 14 is a cylindrical structure having an outer circumferential surface which comprises a perforated screen surface 34 for the entry of a flow of air A. In this embodiment, air screen 14 is rotated in the well known manner about its cylindrical axis by a belt drive 36 driven by engine 20. Air screen 14 is rotated principally for cleaning, as work machines, and particularly harvesters such as sugarcane harvesters like harvester 10, are typically operated in dirty and dusty environments, the dirt and dust being drawn against the outer surface of screen 14 by air flow A. Larger loose items, particularly leaves, will also be present in the cane harvesting environment, and can be drawn and held against screen 14. This can be particularly problematic, as cane leaves, dirt and dust in the cane harvesting environment will typically carry sucrose, which is sticky, and if allowed to build up, will adhere itself and other matter to screen 14. As result, it is desirable to have the capability of removing this matter from the outer surface of screen 14. It is also desirable to have a self-cleaning capability, as a result of the volume of the matter that can build up and interfere with the operation of the apparatus.

Figure 4:
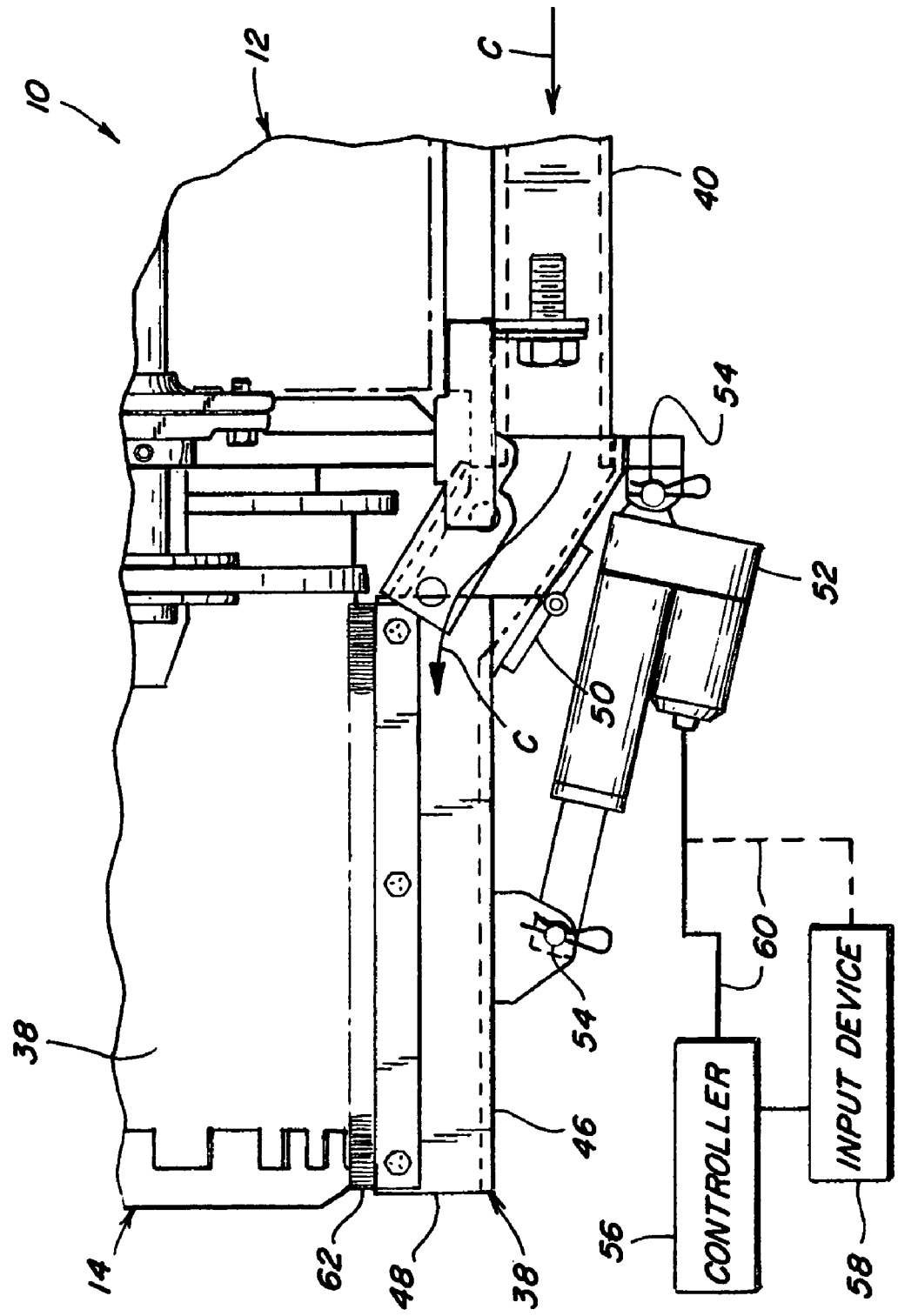
FIG. 4 is an enlarged fragmentary rear view of the apparatus of the invention.
Figure 5:
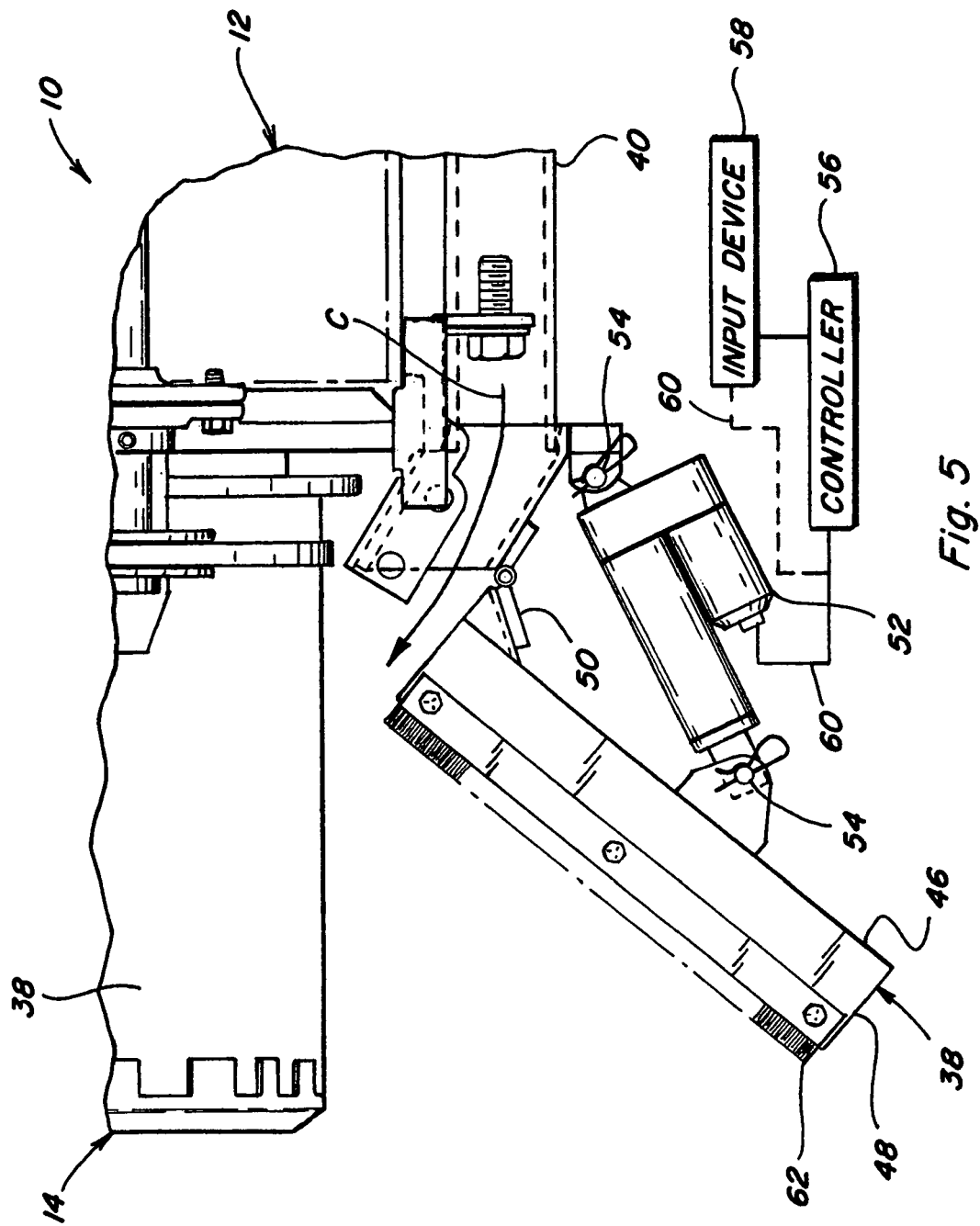
FIG. 5 is another enlarged fragmentary rear view of the apparatus.
Figure 6:
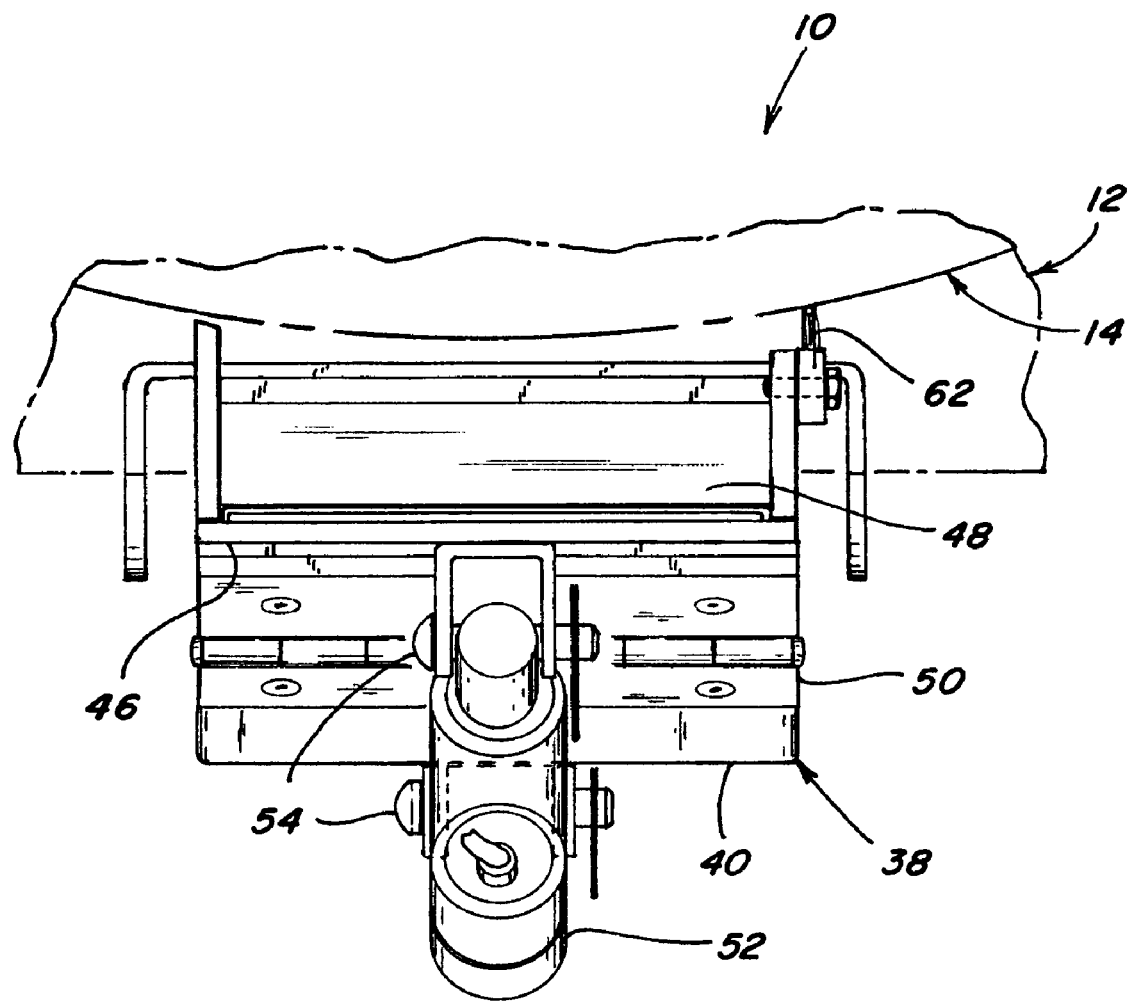
FIG. 6 is an enlarged fragmentary side view of the apparatus.

Referring also to FIGS. 4, 5, and 6, a self-cleaning blow-off 38 constructed and operable according to the teachings of the invention is shown. Self-cleaning blow-off 38 is configured and operable in a operational or blow-off mode for substantially continuously removing debris or matter, including, but not limited to, leaves, dirt, and dust, from perforated screen surface 34, as screen 14 rotates. Additionally, blow-off 38 is operable in a self-cleaning mode for releasing or shedding matter that has built up as result of operation in the blow-off mode. Blow-off 38 can be operated in the self-cleaning mode periodically, from time to time, or responsive to an input, such as, but not limited to, an operator input or an automatic input from a sensor or the like generated when self-cleaning is required.

Blow-off 38 includes a blow-off channel 40 which has an inlet 42 (FIG. 3) disposed adjacent a suitable source of pressurized fluid, which is preferably outlet 32 of fan box 26, for receiving a portion of flow of air B, and redirecting it toward air screen 14, as denoted by arrow C. Channel 40 includes a preliminary blow-off channel section 44, which includes inlet 42, and which has a C-shape when viewed from the side for redirecting the air flow C toward screen 14. Section 44 also narrows down or reduces in sectional extent downstream of inlet 42, for increasing air flow velocity therein. Preliminary blow-off channel section 44 extends beneath fan box 26 and cooler box 16, and slants upwardly toward the bottom of air screen 14. At this location, preliminary blow-off channel section 44 connects with a movable blow-off channel section 46, into which air flow C is directed.

Movable blow-off channel section 46 is an upwardly open U-shape member and extends to a discharge outlet 48 located below the end of screen 14. Movable blow-off channel section 46 is configured and supported to be movable between an operational position disposed directly beneath screen surface 34 of air screen 14, and a cleaning position disposed away from screen 34. In the operational position, movable blow-off channel section 46 is positioned for directing flow of air C along screen surface 34 for blowing debris and dirt, e.g., leaves, dirt, and dust, outwardly away through discharge outlet 48. In the cleaning position, channel section 46 is preferably turned so as to be angled or slanted downwardly away from screen 14, so as to release any built up or accumulated debris or matter from section 46 and also screen surface 34.

Movable blow-off channel section 46 is preferably connected by a connector 50 to section 44 for movement up and down between the operational and cleaning positions. The preferred connector 50 is a pivot or hinge, such as, but not limited to, a mechanical or living hinge, although other movable connectors could be used. An actuator 52 is connected between sections 44 and 46 and is controllably operable for effecting movements of section 46 between the operational and cleaning positions. Here, actuator 52 is preferably a linear actuator, but, other actuators such as, but not limited to, a rotary actuator, could be used. Actuator 52 can be electrically, fluid, or otherwise suitably powered, as desired. Actuator 52 is connected to sections 44 and 46 by pivots 54, and is extendable (FIGS. 1, 3, 4, and 6) for holding section 46 in the operational position, and retractable (FIG. 5) for pivoting or turning section 46 downwardly to the cleaning position.

A controller 56 is preferably connected in operative control of actuator 52, and connected to an input device 58, via suitable conductive paths 60, which can be for instance, a wire or wires of a wiring harness, or a wireless communications network. Alternatively, or additionally, as denoted by dotted line 60, input device 58 can be connected directly to actuator 52, if desired. In normal conditions (no self-cleaning action is taking place) blow-off 38 will operate with movable blow-off channel 46 in the operative position for directing flow of air C across perforated surface 34, for removing debris such as leaves, dirt and dust. This matter will be directed along the channel, and will be discharged through discharge outlet 48. A panel (not shown) can be placed within screen 14, just above channel 46, for reducing air flow through the screen at that location, to facilitate release of any adhered matter. Channel 46 can also include one or more brushes 62 extending lengthwise therealong, for brushing perforated surface 34, or spaced marginally therefrom, for brushing matter away, and will also operate for limiting escape of air from the channel to the side.

From time to time, or when movable channel section 46 is blocked, actuator 52 will be operated to move channel section 46 to the cleaning position, away from rotary screen 14. This will cause any debris that blocks the channel to fall and thus be evacuated from the channel so as to effectively clean the channel. After a selected amount of time, actuator 52 will be operated to move channel section 46 back to the operational position. This completes one self-cleaning cycle. In one mode of operation, during a certain timeframe, this cycle can be repeated several times.

As another possible mode of operation, channel section 46 can be moved to the cleaning position manually, for instance by operator actuation of input device 58. For this purpose, input device 58 can be configured as a pushbutton or other suitable operator controllable input device. As another possibility, input device 58 can comprise a sensor, for instance, one which detects when channel section 46 is blocked, and which can generate a signal to controller 56, and/or which can activate an alarm in an operator cab to inform the operator of the blockage such that the operator can manually actuate the operator input, e.g., pushbutton.

As still another option, controller 56 can be a programmable device including software, or a timer device, which will operate actuator 52 at certain times; or it can be linked to the operation of other parts/functions of the machine, e.g., activation of the unloading tube if used with a combine harvester or the like.

As a desirable advantage of the self-cleaning blow-off of the invention, under heavy fouling conditions of the air screen, stopping operation is not required to clean the blow-off channel manually.

As another advantage, the blow-off can be mounted in a variety of locations about a rotary screen. For instance, an upper region of the rotary air screen, such that, when the blow-off is moved away from the screen, the released debris and dirt from the blockage will be pushed away by the rotation of the screen. If the blow-off is mounted on a lower region of the screen, the released dirt will be removed by gravity, and, in addition, possible vibrations due to operation of the machine.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A self-cleaning blow-off for a rotary air screen, comprising:
a blow-off channel including an inlet disposed for receiving a flow of air from an air source, and a movable blow-off channel section mountable externally to the air screen and disposed adjacent to a bottom portion of the air screen, the movable blow-off section includes an upwardly open U-shaped channel extending along substantially the length of the bottom portion of the air screen, wherein the movable blow-off section has a discharge outlet at a distal end thereof, the moveable blow-off section configured and supported to be movable between an operational position disposed adjacent to the bottom portion of the air screen for directing the flow of air across the bottom portion of the air screen for blowing debris and dirt from the screen and directing the debris and dirt along the channel to be discharged through the discharge outlet, and a cleaning position disposed away from the screen such that accumulated debris and dirt in the blow-off section will be released, and an actuator connected to and controllably operable for moving the movable blow-off section between the operating position and the cleaning position.

2. The blow-off of claim 1, wherein the air source comprises a fan configured and operable for generating an air flow through the air screen, and the inlet of the blow-off channel is positioned and oriented for receiving a portion of the air flow into a preliminary blow-off channel section extending to the movable blow-off channel section.

3. The blow-off of claim 2, wherein the movable blow-off channel section is mounted to the preliminary blow-off channel section for pivotal movement between the operational position and the cleaning position.

4. The blow-off of claim 1, wherein the movable blow-off channel section comprises a brush extending along the open portion positioned for brushing debris and dirt from the screen.

5. The blow-off of claim 1, further comprising a controller connected to the actuator and configured so as to be automatically operable for controllably operating the actuator for periodically moving the movable blow-off channel section between the operational and cleaning positions.

6. The blow-off of claim 1, further comprising a controller connected to the actuator and configured for controllably operating the actuator for moving the movable blow-off channel section from the operational position to the cleaning position, responsive to an input.

7. The blow-off of claim 1, wherein, when in the cleaning position, the movable blow-off channel section is oriented at an acute angle to the screen.

8. A self-cleaning rotary air screen, comprising:
a rotary air screen; and
a blow-off disposed for removing debris from the air screen, including a preliminary blow-off channel section having an inlet disposed for receiving a flow of air from a pressurized air source, and a movable blow-off channel section in connection with the preliminary blow-off channel section for receiving the flow of air, the movable blow-off channel section disposed adjacent to a bottom portion of the air screen, wherein the movable blow-off section is an upwardly open U-shaped channel extending along substantially the length of the bottom portion of the air screen, wherein the movable blow-off section has a discharge outlet at a distal end thereof, the moveable blow-off section configured and supported to be movable between an operational position adjacent to the bottom portion of the air screen for directing the flow of air across the bottom portion of the air screen for blowing debris therefrom, and directing the debris along the channel to be discharged through the discharge outlet, and a cleaning position spaced away from the screen for releasing accumulated debris from the movable blow-off section, and an actuator connected to and controllably operable for moving the movable blow-off section between the operating position and the cleaning position.

9. The self-cleaning rotary air screen of claim 8, wherein the pressurized air source comprises a fan configured and operable for generating an air flow through the air screen, and the inlet of the preliminary blow-off channel is positioned and oriented for receiving a portion of the air flow.

10. The self-cleaning rotary air screen of claim 8, wherein the movable blow-off channel section is mounted to the preliminary blow-off channel section for pivotal movement between the operational position and the cleaning position.

11. The self-cleaning rotary air screen of claim 8, wherein the movable blow-off channel section comprises a brush extending along the open side positioned for brushing debris and dirt from the screen.

12. The self-cleaning rotary air screen of claim 8, further comprising a controller connected to the actuator and configured so as to be automatically operable for controllably operating the actuator for periodically moving the movable blow-off channel section between the operational and cleaning positions.

13. The self-cleaning rotary air screen of claim 8, further comprising a controller connected to the actuator and configured for controllably operating the actuator for moving the movable blow-off channel section from the operational position to the cleaning position, responsive to an input.

14. The self-cleaning rotary air screen of claim 8, wherein, when in the cleaning position, the movable blow-off channel section is oriented at an acute angle to the screen.

15. A harvesting machine, comprising:
   a heat exchanger housing containing at least one heat exchanger;
   a fan operable for generating an air flow through the heat exchanger housing and the at least one heat exchanger;
   a rotary air screen disposed in covering relation to an inlet of the heat exchanger housing and operable for catching debris from the air flow prior to entering the heat exchanger housing; and
   a blow-off disposed for removing debris from the rotary air screen, including a preliminary blow-off channel section having an inlet disposed for receiving a portion of the air flow generated by the fan, and a movable blow-off channel section in connection with the preliminary blow-off channel section for receiving the portion of the air flow, the movable blow-off channel section disposed adjacent to a bottom portion of the air screen, wherein the movable blow-off section is an upwardly open U-shaped channel extending along substantially the length of the bottom portion of the air screen, wherein the movable blow-off section has a discharge outlet at a distal end thereof, the movable blow-off section configured and supported to be movable between an operational position adjacent to the bottom portion of the air screen for directing the portion of the air flow along the bottom portion of the air screen for blowing the debris caught thereby from the air screen and directing the debris along the channel to be discharged through the discharge outlet, and a cleaning position spaced away from the screen for releasing accumulated debris from the movable blow-off section, and an actuator connected to and controllably operable for moving the movable blow-off section between the operating position and the cleaning position.

16. The harvesting machine of claim 15, wherein the movable blow-off channel section is mounted to the preliminary blow-off channel section for pivotal movement between the operational position and the cleaning position.

17. The harvesting machine of claim 15, wherein the movable blow-off channel section comprises a brush extending along the open side positioned for brushing debris and dirt from the screen.

18. The harvesting machine of claim 15, further comprising a controller connected to the actuator and configured so as to be automatically operable for controllably operating the actuator for periodically moving the movable blow-off channel section between the operational and cleaning positions.

19. The harvesting machine of claim 15, further comprising a controller connected to the actuator and configured for controllably operating the actuator for moving the movable blow-off channel section from the operational position to the cleaning position, responsive to an input.

* * * * *